United States Patent [19]
Worden, Jr.

[11] Patent Number: 5,892,654
[45] Date of Patent: *Apr. 6, 1999

[54] APPARATUS FOR IMPROVED AIR FLOW THROUGH A COMPUTER CHASSIS

[75] Inventor: Curtis W. Worden, Jr., Decatur, Ala.

[73] Assignee: Intergraph Corporation, Huntsville, Ala.

[*] Notice: This patent issued on a continued prosecution application filed under 37 CFR 1.53(d), and is subject to the twenty year patent term provisions of 35 U.S.C. 154(a)(2).

[21] Appl. No.: 866,479

[22] Filed: May 30, 1997

Related U.S. Application Data

[60] Provisional application No. 60/018,871 May 31, 1996.

[51] Int. Cl.[6] .................................................. H05K 7/20
[52] U.S. Cl. ...................... 361/690; 211/41.17; 361/796; 454/184
[58] Field of Search ................................ 312/223.2, 236; 454/184; 165/80.3, 121–126; 364/708.1; 211/47, 50, 69.1, 41.17; 361/687–690, 692–695, 784, 785, 788, 796, 801, 681

[56] References Cited

U.S. PATENT DOCUMENTS

| | | |
|---|---|---|
| 5,218,514 | 6/1993 | Huynh et al. . |
| 5,243,493 | 9/1993 | Jeng .......................................... 361/690 |
| 5,297,004 | 3/1994 | Mazura ................................... 361/690 |
| 5,375,038 | 12/1994 | Hardt ....................................... 361/694 |
| 5,435,362 | 7/1995 | Winkler .................................... 361/681 |
| 5,446,619 | 8/1995 | Madsen et al. . |
| 5,564,930 | 10/1996 | Yu .............................................. 439/61 |
| 5,684,674 | 11/1997 | Yin .......................................... 361/695 |

OTHER PUBLICATIONS

"Printed Circuit Card Restraint Mechanism", IBM Technical Disclosure Bulletin, vol. 36, No. 6B, Jun. 1, 1993, pp. 527–528.
"Air Baffle For Planar Memory Cooling", IBM Technical Disclosure Bulletin, vol. 35, No. 5, Oct. 1, 1992, pp. 235–236.

*Primary Examiner*—Gerald Tolin
*Attorney, Agent, or Firm*—Bromberg & Sunstein LLP

[57] ABSTRACT

A computer system having an air cooling path includes a motherboard, a circuit board having an edge connector for mounting onto the motherboard, and a chassis defining an interior for containing the circuit board and motherboard. The chassis includes a rear panel having an inset access for accessing the circuit board, where the inset access is spaced inwardly from the rear panel. The computer system further includes an interior panel (within the interior of the chassis) that is connected to the rear panel at a connection location on the rear panel. The connection location is spaced apart on the rear panel from the inset access. The motherboard is mounted to the interior panel, while the rear panel defines a vent between the inset access and the connection location. The interior panel, motherboard, and vent define the air cooling path across the circuit board.

12 Claims, 3 Drawing Sheets

APPARATUS FOR IMPROVED AIR FLOW THROUGH A COMPUTER CHASSIS

This application claims priority from provisional application Ser. No. 60/018,871 filed May 31, 1996, entitled "Apparatus and Method for Improved Airflow Through a Chassis" which is incorporated herein by reference.

FIELD OF INVENTION

The present invention generally relates to the airflow path through a chassis, and more particularly to a method and an apparatus for achieving an improved airflow path through a computer chassis.

BACKGROUND OF THE INVENTION

Typically, the airflow in a computer chassis is received or ejected in an area that is adjacent to the removable circuit boards which have an edge connector for connection to a mother board. Moreover, the removable circuit boards usually include thermally sensitive components that reliably operate only within a certain temperature range. Therefore, these components require a certain amount of cooled air to maintain a temperature within that range.

Using the traditional method of defining an airflow path in a chassis creates a region of low airflow across an area of the removable circuit board. Because of this region of low airflow, circuit board designers are required to keep thermally sensitive components out of that area. Thus, the design options and possibilities are unnecessarily limited.

Therefore, what is needed is a method and an apparatus that provides for an improved airflow path over all areas of a removable circuit board mounted inside a chassis such that the efficiency of the device used to move the air through the chassis is increased.

SUMMARY OF THE INVENTION

The present invention, in a preferred embodiment, is directed to a computer chassis having an improved airflow path along a removable circuit board mounted inside the chassis. The removable circuit board has a connector along one edge for connection to a mother board. The chassis comprises a rear panel, means for mounting the mother board inside the chassis such that the rear edge of the mother board is spaced from the rear panel to define a setback, and means for providing an inset access to the removable circuit board such that the inset access is positioned within the space forming the setback. The chassis further comprises an airflow path along the removable circuit board, over the rear edge of the mother board and across the setback. The airflow path may end with a plurality of vent locations within the setback and in the rear panel proximate to the setback. These vent locations are for receiving air into and ejecting air out of the chassis.

The means for mounting the mother board may include an interior panel mounted inside the chassis such that the interior panel is parallel to and spaced below the mother board. The interior panel may be attached to the rear panel in a position transverse to the rear panel. Moreover, the means for providing an inset access to the removable circuit board may include a removable cover plate.

DETAILED DESCRIPTION OF THE DRAWINGS

Figure 1:
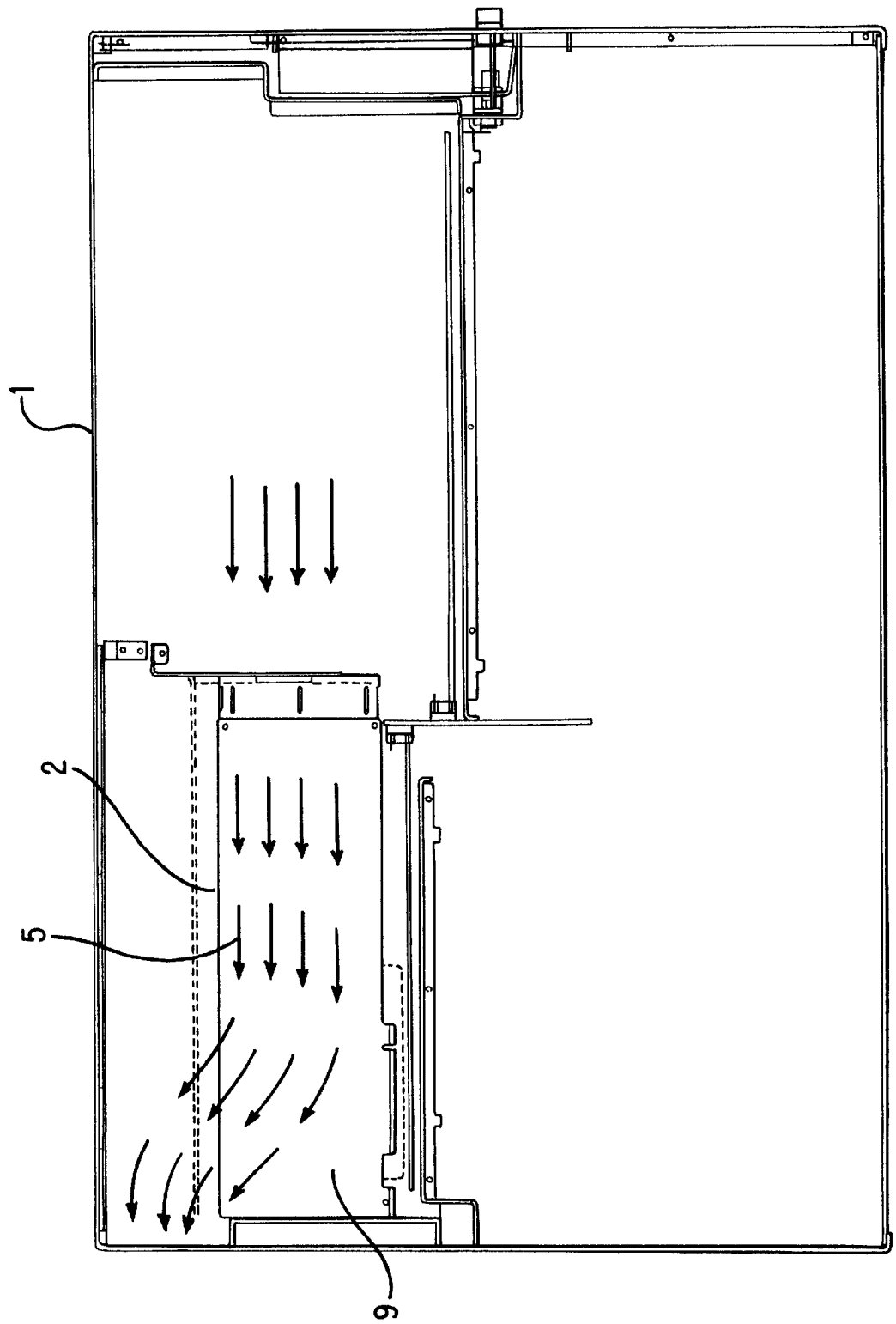
FIG. 1 is a side view of a prior art chassis showing the airflow path across a removable circuit board mounted inside the chassis.

Referring now to the drawings, FIG. 1 shows the airflow path across a removable circuit board 2 mounted inside of a prior art chassis 1. The chassis 1 has a means of providing airflow (not shown) through the chassis 1. An airflow path is indicated by arrows 5. As shown, a region of low airflow is created across an area 9 of the removable circuit board 2. This region of low airflow is eliminated in a chassis 10 (shown in FIG. 2) of a preferred embodiment of the present invention.

Figure 2:
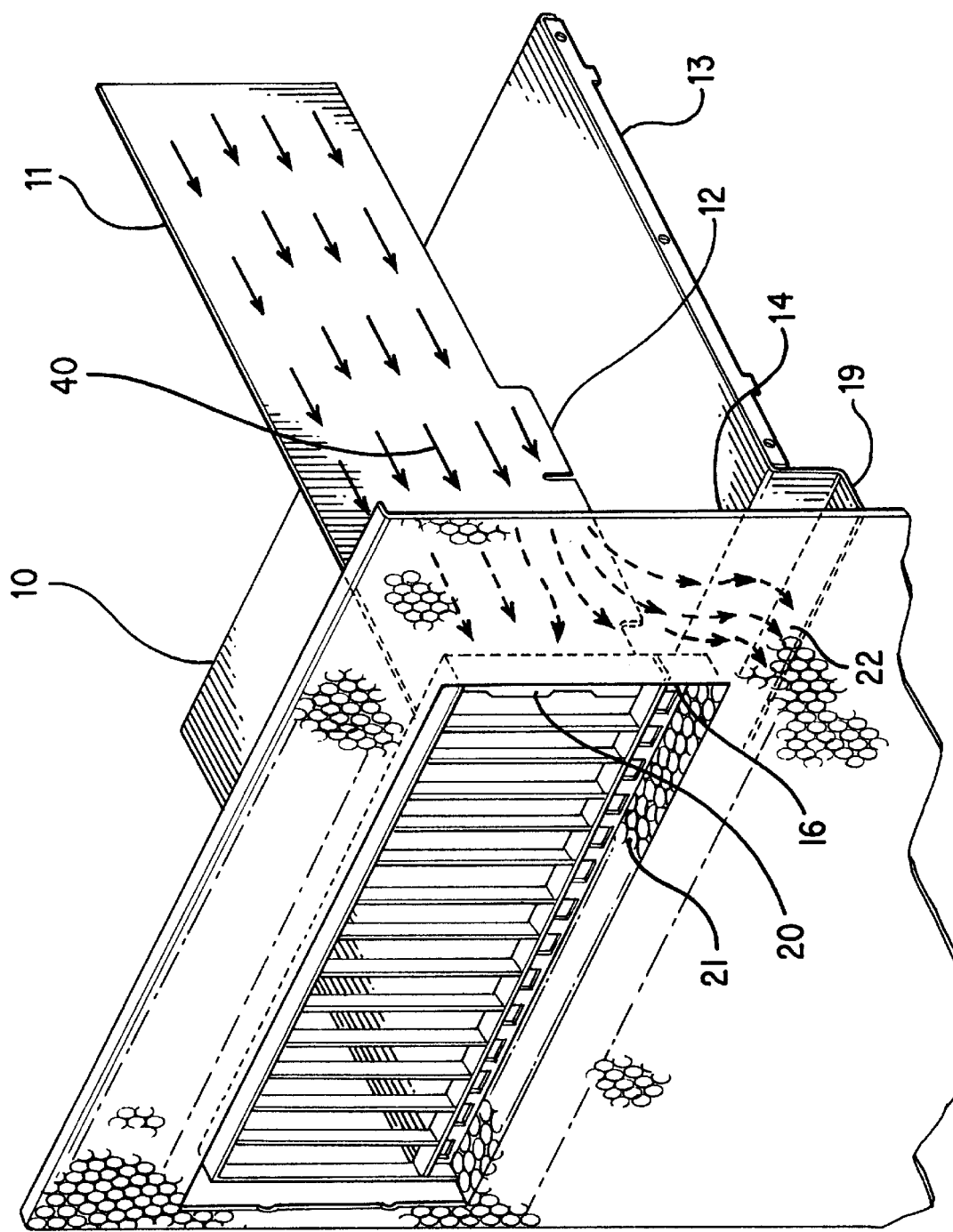
FIG. 2 is an isometric side view of a portion of a chassis of a preferred embodiment of the present invention.

Referring now to FIG. 2, an isometric view of a portion of a chassis 10 of a preferred embodiment of the present invention is shown. Chassis 10 has a means for providing airflow (not shown). A removable circuit board 11 is mounted in chassis 10. Edge connector 12 of circuit board 11 is used for connection to a mother board 30 (shown in FIG. 3). The mother board 30 has a rear edge 31 and may be mounted above a interior panel 13. Interior panel 13 is mounted transverse to a rear panel 14 of chassis 10.

The mother board 30 is mounted such that mother board 30 is spaced from the rear panel 14 to define a setback. Thus an airflow path 40 is defined along the removable circuit board 11, over the rear edge of the mother board 30 and across the setback. Alternatively, the setback may be defined by a bracket 19 formed at the point of attachment of the rear panel 14 and the interior panel 13.

Moreover, an inset access 16 to the removable circuit board 11 is provided. The inset access 16 is defined such that it may be positioned within the space forming the setback. The inset access 16 may include a removable cover plate 20.

A first plurality of vent locations 21 within the setback may provide the means for receiving airflow into and ejecting airflow out of the chassis. In addition, a second plurality of vent locations 22 within the rear panel 14 and proximate to setback may provide means for receiving airflow into and ejecting airflow out of the chassis 10. This arrangement for mounting the mother board 30 and the removable circuit board 11 in the chassis 10 provides an improved airflow path as shown in FIG. 3.

Figure 3:
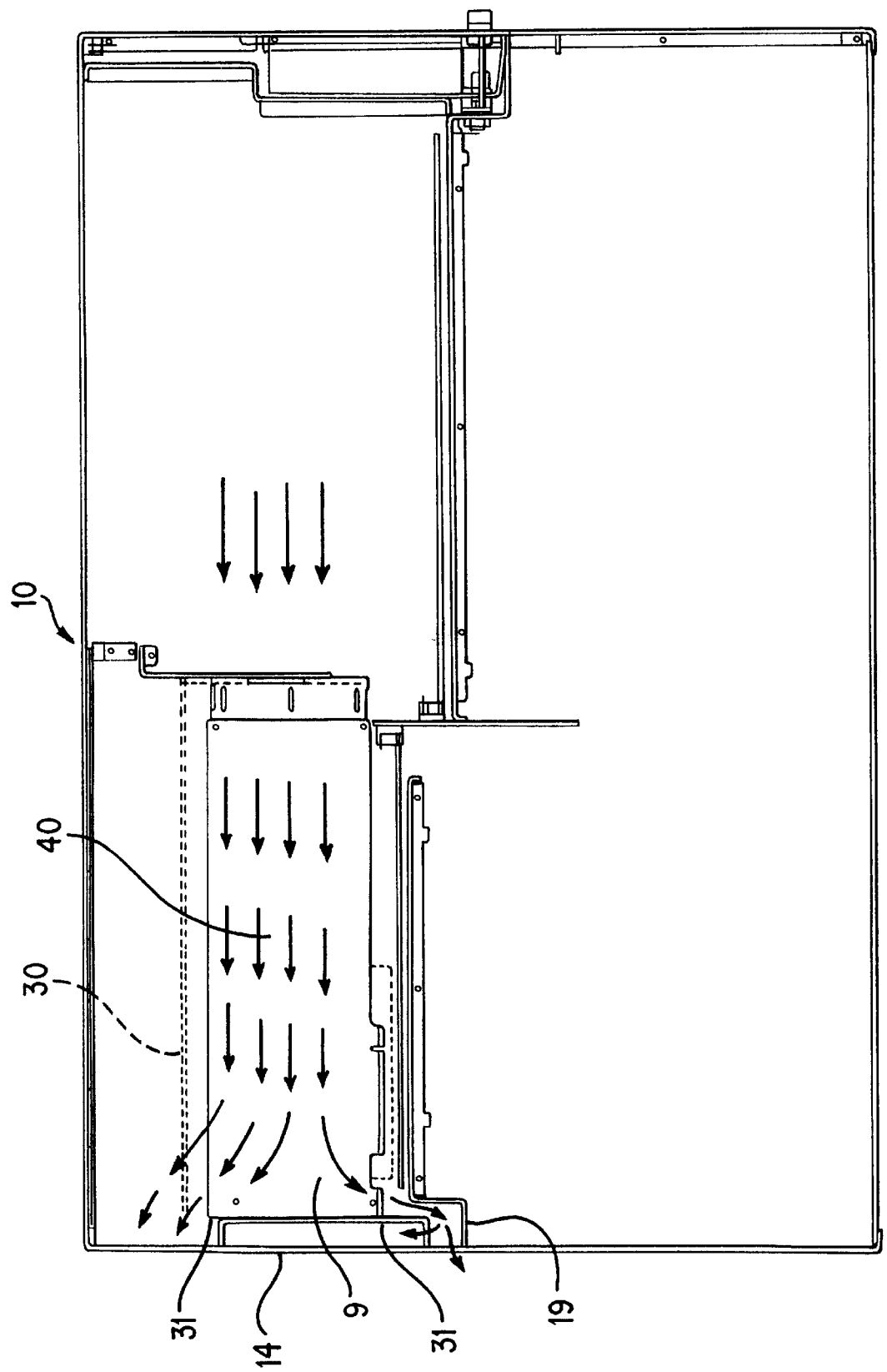
FIG. 3 is a side view of the chassis of FIG. 2 showing the improved airflow path across a removable circuit board mounted inside the chassis.

FIG. 3 is a side view showing the improved airflow path 40 through chassis 10 of FIG. 2. For example, as air is pushed through the chassis 10, the airflow path 40 now includes area 9 along the removable circuit board 11. Moreover, airflow path 40 provides for the flow of air over the rear edge 31 of the mother board 30 and across the setback. In addition, the airflow path may end through the first and second plurality of vent locations 21 and 22, respectively (shown in FIG. 2). The vent locations 21 and 22 are for receiving air into or ejecting air out of the chassis 10 depending upon the direction of the airflow path within the chassis 10.

Of course, it should be understood that various changes and modifications to the preferred embodiment described above will be apparent to those skilled in the art. Therefore, such changes can be made without departing from the spirit and the scope of the invention and without diminishing its attendant advantages. It is therefore intended that such changes and modifications be covered by the following claims.

What is claimed is:

1. A computer system having an air cooling path, the computer system comprising:
   a motherboard;
   a circuit board having an edge connector mounting onto the motherboard;
   a chassis defining an interior containing the circuit board and motherboard, the chassis further including a rear panel having an inset access for accessing the circuit board, the inset access being spaced inwardly from the rear panel; and
   an interior panel within the interior of the chassis and being connected to the rear panel at a connection location on the rear panel, the connection location being spaced apart on the rear panel from the inset access;
   the motherboard being mounted to the interior panel;
   the rear panel defining a vent between the inset access and the connection location,
   the interior panel, motherboard, and vent defining the air cooling path across the circuit board.

2. The computer system as defined by claim 1 wherein the inset access defines an access plane that is substantially parallel to the rear panel, the interior panel further defining a shoulder that defines a shoulder plane substantially parallel to the access plane, the shoulder plane being spaced inwardly from the access plane.

3. The computer system as defined by claim 2 wherein the circuit board includes a rear edge, the shoulder plane being spaced inwardly from the rear edge of the circuit board.

4. The computer system as defined by claim 1 wherein the motherboard includes a rear edge that is spaced inwardly from the inset access.

5. The computer system as defined by claim 1 wherein the inset access includes a cover plate.

6. The computer system as defined by claim 1 wherein the circuit board is mounted substantially perpendicular to the motherboard.

7. A computer system providing enhanced cooling air flow for cooling a circuit board, said system includes said circuit board mounted on a motherboard via an edge connector, the motherboard having a rear edge, the system further comprising:
   a chassis defining an interior containing the motherboard and the circuit board, the chassis further including a rear panel having an inset access for accessing the circuit board, the inset access being spaced inwardly from the rear panel;
   an interior panel within the interior of the chassis, the interior panel being linked to the rear panel at a connection location of the rear panel to define a motherboard ventilation region between the connection location and the inset access, said region including a vent between the inset access and connection location;
   the interior panel also supporting the motherboard to define a space between the rear edge of the motherboard and the inset access, the space defining an air flow path that is in communication with the motherboard ventilation region;
   the space enabling air to flow between the region of the circuit board at the edge connector and the motherboard ventilation region.

8. The computer system as defined by claim 7 wherein the rear panel defines a vent in the motherboard ventilation region.

9. The computer system as defined by claim 7 wherein the interior panel defines a shoulder that defines the space at least in part.

10. The computer system as defined by claim 7 wherein the rear edge of the motherboard is spaced inwardly from the inset access.

11. The computer system as defined by claim 7 wherein the inset access includes a cover plate.

12. The computer system as defined by claim 7 wherein the circuit board is mounted substantially perpendicularly to the motherboard.

\* \* \* \* \*